Figure 1:
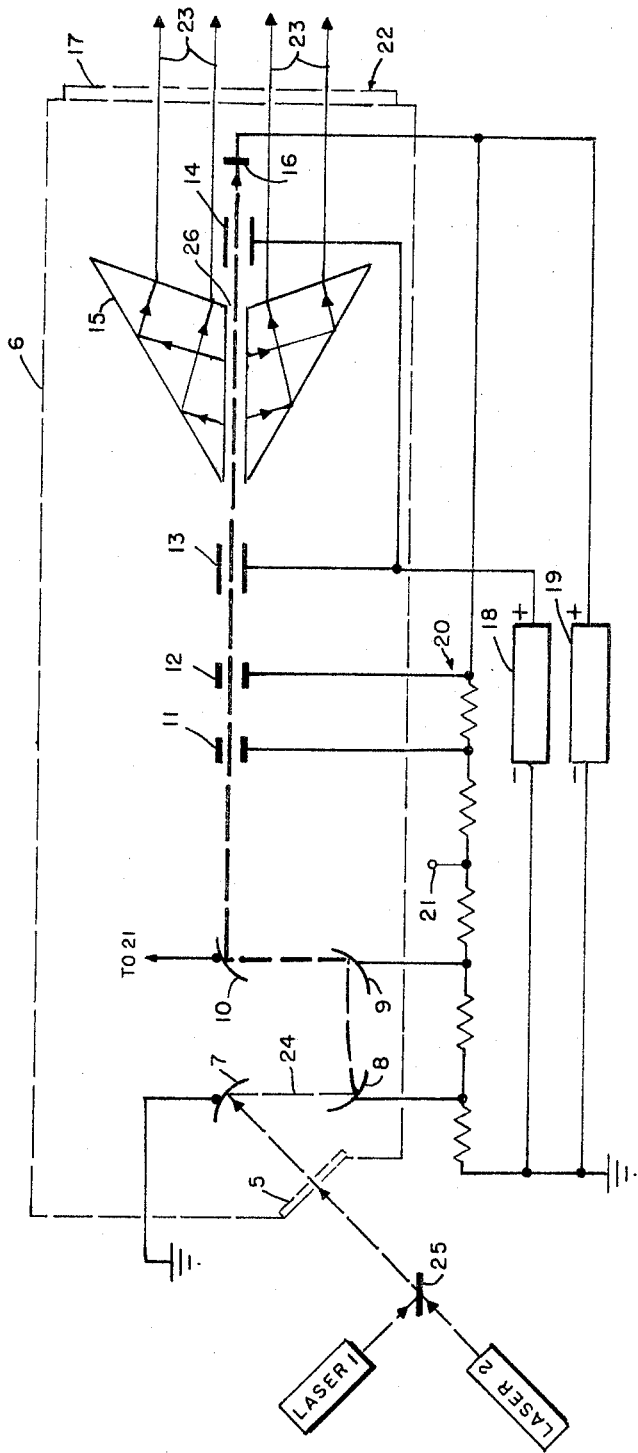

Sept. 6, 1966  E. L. FROST  3,271,573
GENERATION OF COHERENT MILLIMETER AND SUB-MILLIMETER
WAVELENGTH RADIATION
Filed Sept. 17, 1963  2 Sheets-Sheet 1

INVENTOR,
EMERSON L. FROST

BY Harry M. Saragovitz,
Edward J. Kelly,
Herbert Berl &
Julian C. Keppler,
ATTORNEYS Sept. 6, 1966                    E. L. FROST                    3,271,573
          GENERATION OF COHERENT MILLIMETER AND SUB-MILLIMETER
                           WAVELENGTH RADIATION
Filed Sept. 17, 1963                                      2 Sheets-Sheet 2
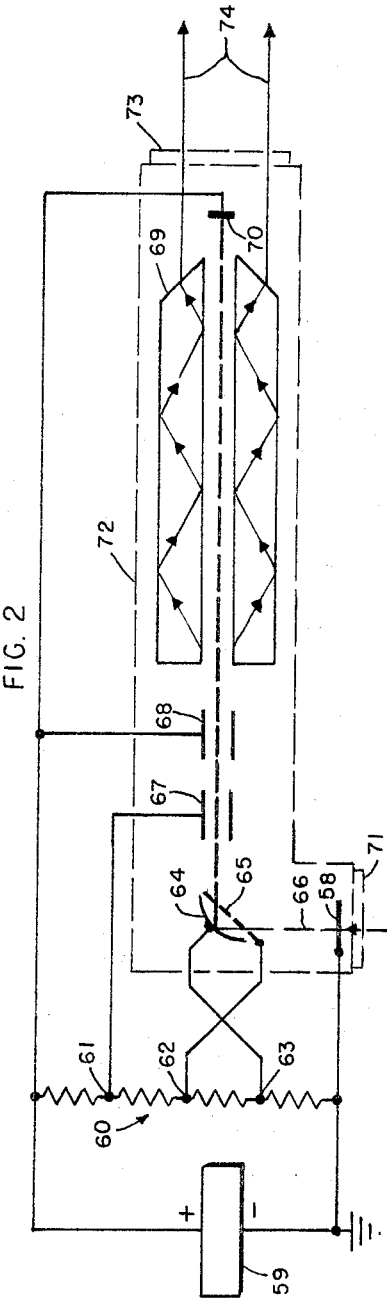
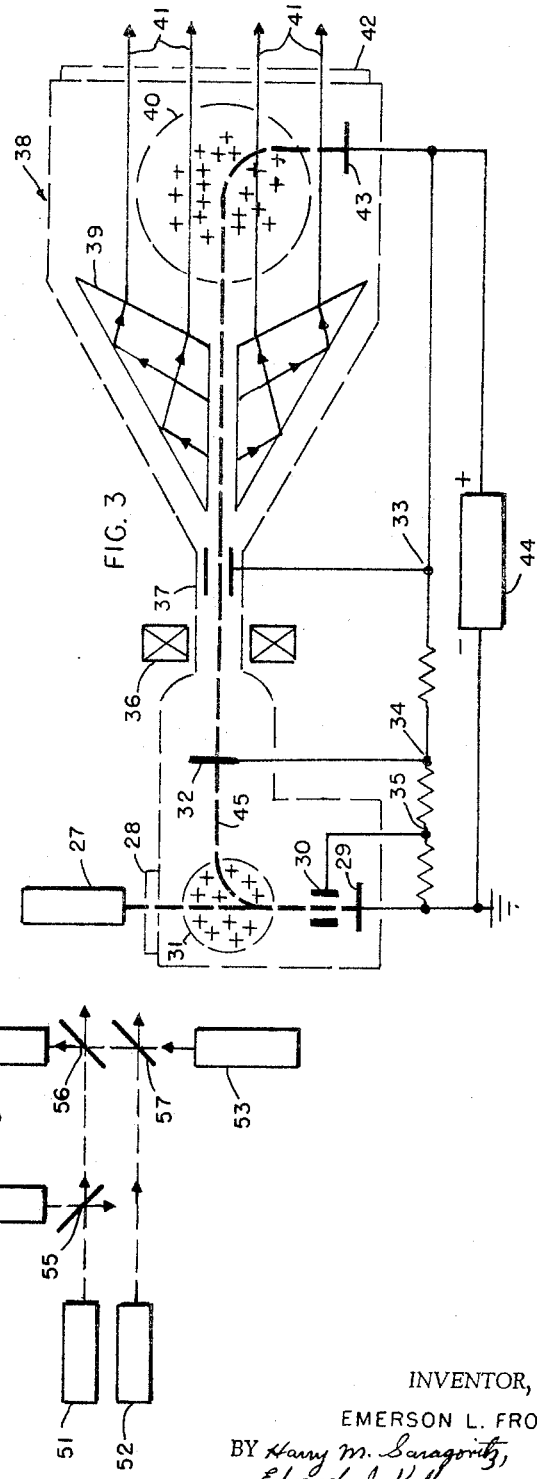
INVENTOR,
EMERSON L. FROST
BY Harry M. Saragovitz,
   Edward J. Kelly,
   Herbert Berl &
   Julian C. Keppler   ATTORNEYS.

United States Patent Office 3,271,573
Patented Sept. 6, 1966

3,271,573
GENERATION OF COHERENT MILLIMETER AND SUB-MILLIMETER WAVELENGTH RADIATION
Emerson L. Frost, Manasquan, N.J., assignor to the United States of America as represented by the Secretary of the Army
Filed Sept. 17, 1963, Ser. No. 309,582
12 Claims. (Cl. 250—84)

The invention described herein may be manufactured and used by or for the Government for governmental purposes without the payment of any royalty thereon.

This invention relates to the generation of electromagnetic waves in the ultra-microwave region of the spectrum and more particularly to a novel and useful means for efficiently generating such waves by means of a bunched electron beam produced by beating or heterodyning two or more sources of coherent light and extracting beat-frequency energy from the beam by means of a linear output coupler such as a Cerenkov radiator.

At present there exists a relatively small region of the spectrum between the microwave and infra-red wavelengths for which no efficient generators exist. Past efforts to extend conventional microwave circuitry to the millimeter and submillimeter wavelengths have met with only limited success. Microwave components such as resonant cavities, waveguides and slow wave structures require dimensions comparable to the half wavelength of the energy supported therein. These small dimensions raise problems of arc-over even at low power outputs due to the high voltage gradients existing across the small spaces therein. Further, the high losses at these wavelengths and the small component dimensions result in low efficiency and create problems of heat dissipation. Other approaches to this problem involve frequency multiplication of microwave frequencies by means of non-linear or parametric devices. Both of these approaches are inefficient because all of the energy at all of the harmonic frequencies other than the desired frequency is lost.

The present invention involves the generation of energy of millimeter and submillimeter wavelength directly by means of a coherent, tightly bunched, high current electron beam which is produced by the beating of two or more laser beams at a photocathode. The mixing of the laser beams arises because of the non-linear nature of the photocathode, the current emitted thereby being proportional to the incident light intensity or the electric field amplitude squared. The beating of the two coherent light beams causes discrete bunches of electrons to be emitted coherently from the photocathode, at the difference frequency of the two incident light beams. The coherence of the emitted electron beam follows necessarily from the coherence of the incident light beams. The physical meaning of coherence is that each elementary area of the photocathode emits electrons in step with every other elementary area, thus producing a tightly bunched electron beam. The beat frequency component of the electron beam current can be efficiently converted to electromagnetic radiation of corresponding frequency by means of a Cerenkov output coupler. Considerable output power can be obtained at relatively low electron beam voltage by maximizing both the beam current and the dielectric constant of the output coupler. Photomultiplier methods of electron multiplication can be utilized to increase the electron beam current without causing appreciable debunching.

It is therefore an object of this invention to provide an improved generator of coherent radiation of millimeter and submillimeter wavelengths.

Another object of the invention is to provide novel and useful means for producing a high current bunched electron beam combined with efficient means for directly converting the alternating component thereof to coherent electromagnetic radiation of wavelength of the order of one millimeter.

Figure 1A:
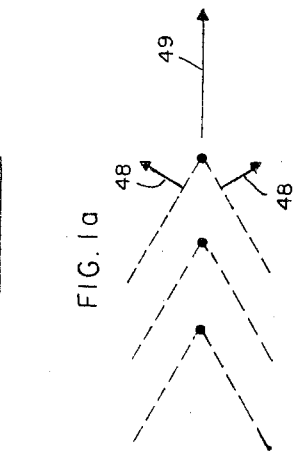

Other objects and advantages of the invention will become apparent from the following detailed description and drawings, in which:

FIG. 1 is a schematic diagram of one embodiment of the invention and FIGS. 2 and 3 are modifications thereof. FIG. 1a is a diagram illustrating the operation of the devices of FIGS. 1, 2 and 3.

The ultra-microwave generator of FIG. 1 comprises an evacuated envelope 6, containing a photocathode 7 mounted adjacent an optical window 5. The beams of a pair of monochromatic lasers 1 and 2 are combined by means of a half silvered mirror 25 and are directed through window 5 to photocathode 7. The bunched electron beam resulting from the mixing of the two laser beams at the photocathode follows the path 24. The electron beam current is multiplied by secondary emission from dynodes 8, 9 and 10. The beam is focussed and accelerated by means of electrodes 11 and 12. The electrodes 13 and 14, connected to the positive terminal of high voltage supply 18, define a drift region in which the alternating energy of the bunched beam is extracted therefrom by means of a Cerenkov coupler or radiator 15. Collector 16 is connected to the positive terminal of power supply 19. A voltage divider 20 is connected across power supply 19 and provides taps of increasing positive voltage for dynodes 8, 9 and 10 and focusing electrodes 11 and 12. The voltage of power supply 18 is made higher than that of power supply 19, therefore the collector 16 is depressed relative to electrodes 13 and 14. This increases the efficiency by lowering the heat loss at the collector. Cerenkov coupler 15 is shown in cross-section. The shape of this element is generally conical with a central bore 26 through the axis of symmetry thereof through which the electron beam passes and a conical cutout section at the base or right hand end of the cone. If a bunched electron beam moves through or close to a dielectric medium with a velocity greater than the phase velocity of light in the dielectric medium the dielectric will emit radiation at the bunching frequency and its harmonics. This is known as the Cerenkov effect. This effect is somewhat analogous to the shock wave produced when an aircraft exceeds the speed of sound in the air which it traverses or the bow wave produced by a ship as it moves through the surrounding water. In FIG. 1a the dashed lines are the wavefronts produced by a bunched electron beam as it moves through a dielectric in the direction of the arrow 49. The arrows 48 show the direction of propagation of the Cerenkov radiation. The shape of the Cerenkov coupler 15 of FIG. 1 is such that the output radiation is collimated into a directional beam, as indicated by the arrow 23. The radiation passes out of window 17 which is made transparent to radiation of millimeter wavelength.

The lasers 1 and 2 may be either of the pulsed or continuous wave types. The laser wavelengths are chosen so that the corresponding frequency difference between them is equal to the desired output frequency. Output frequencies of $10^{11}$ to $10^{12}$ c.p.s. (100 to 1000 kmc.) are possible with the generators of FIGS. 1, 2 and 3. The upper frequency limit will be determined by the time constant of the dynodes. Although the exact description of the response time of dynode type electron multipliers is subject to some debate, it can be assumed that the response thereof falls off as does a simple RC low pass filter of time constant T. If each dynode has a secondary emission factor of 10 and $T=5\times10^{-12}$ seconds, the current gain at each dynode will be 20 db at D.C. but 10 db at $10^{11}$ c.p.s. due to the low pass filter effect. This will cause some debunching due to the fact that the D.C. component of beam current is increased more than the A.C. component, however the Cerenkov coupler is a linear device and hence the power output thereof is proportional to the square of the A.C. component of the beam current, so that the current multiplication process is a profitable one in terms of increased output. As mentioned above, the beam velocity must exceed the phase velocity of light within the Cerenkov coupler. Thus, in order to maintain beam velocity or voltage at moderate and practical levels, the dielectric constant of the Cerenkov coupler should be maximized. The dielectric rutile has a dielectric constant of approximately 100 and hence the velocity of light therein is approximately 10% of the free space velocity ($c$). This means that if the output coupler is of rutile or a dielectric of comparable properties, the electron beam need only be accelerated to slightly more than 10% of $c$.

By heterodyning two laser beams as in FIG. 1 the emitted photocathode current will consist of a D.C. component and a sinusoidal component with a peak amplitude equal to the D.C. or average component, the sinusoidal component being at the beat or difference frequency of the two lasers. In such a current waveform the D.C. power exceeds the sinusoidal power and it is the sinusoidal power which is converted to useful output. By simultaneously illuminating the photocathode with three or more laser beams all separated in frequency in steps of the desired output frequency it is possible to enhance the A.C. component of the electron beam current relative to the D.C. component. The beam current will then consist of narrow pulses or extremely tight bunches of electrons. This feature of the invention is illustrated in FIG. 2. In FIG. 2 the beams of four monochromatic lasers 50–53 are combined by means of three half silvered mirrors 55–57 and passed through laser amplifier 54 and optical window 71 to photocathode 58 contained within evacuated electron beam tube 72. If the four lasers are operated in the pulsed mode, the laser amplifier 54 may be unnecessary, however with the C.W. mode of operation the losses in the half silvered mirrors may necessitate the amplification of the combined beams before application to the photocathode. Photocathode 58 is of the transmission type, that is, the incident laser beams illuminate one side thereof and the electron beam is emitted from the opposite side. Photocathode 58 is connected to the negative or grounded terminal of power supply 59. The voltage divider 60, connected across the power supply, provides power operating voltage for the other tube elements. The bunched electron beam 66, emitted by photocathode 58, is attracted to dynode 64. The grid 65, being at a more positive voltage than dynode 64, attracts the secondary electrons emitted thereby and aids in beam focussing. Second anode 68 is connected to the positive terminal of power supply 59 and first anode 67 to voltage divider terminal 61 and therefore these anodes provide focussing as well as acceleration of the electron beam. Collector 70 is also connected to the positive terminal of power supply 59. Output coupler 69 comprises a generally cylindrical dielectric with an axial bore for passage of the electron beam and is conically tapered at the right hand end to collimate the emerging radiation in the direction of arrows 74.

FIG. 3 illustrates a further modification of the invention. In this embodiment a single laser operating simultaneously in two modes provides both of the optical frequencies required for heterodyning. The two modes of oscillation of laser 27 are separated by the desired output ultra-microwave frequency. The beam of the single laser is directed through optical window 28 mounted in the envelope of tube 38 to photocathode 29. The emitted bunched electron beam is accelerated by first anode 30 which is connected to tap 35 on voltage divider 33. An externally produced magnetic field 31, bends the electron beam 45 90° to the right. Element 32 is a foil type electron multiplying dynode which is connected to voltage divider tap 34. The electron bunches impinge on the left side of dynode 32 and the secondary electrons are emitted from the right side thereof. The electron beam is focussed by means of external electromagnet 36 and further accelerated by second anode 37. The beam energy is converted to radiation by passing through Cerenkov coupler 39, which is similar in structure and function to coupler 15 of FIG. 1. The resultant millimeter wavelength radiation emerges from window 42. As the electron beam emerges from coupler 39 it is bent by D.C. magnetic field 40 toward collector 43 which is connected to the positive terminal of power supply 44.

The features of FIGS. 2 and 3 may be combined by substituting two double-mode lasers of the type shown in FIG. 3 for each pair of lasers of FIG. 2. Thus two lasers could be used to provide the four discrete optical frequencies required in the embodiment of FIG. 2.

While the invention has been illustrated in connection with three illustrative embodiments, the invention should not be limited thereto, since many modifications are possible without departing from the inventive concepts disclosed herein. Accordingly the invention should be limited only by the scope of the appended claims.

What is claimed is:

1. A generator of electromagnetic energy at frequencies intermediate the microwave and infra-red regions of the spectrum comprising, an electron beam tube, said tube including a photoemissive cathode, means to simultaneously illuminate said cathode with a plurality of coherent light beams, the frequency of said light beams being separated in steps of the desired output frequency, means to multiply the current of the bunched electron beam emitted by said cathode, means to pass said electron beam through a Cerenkov radiator, means to accelerate said electron beam to a velocity greater than the phase velocity of light in said Cerenkov radiator, said Cerenkov radiator being shaped to unidirectionally collimate the radiation generated therein.

2. A generator of electromagnetic energy of millimeter and submillimeter wavelength comprising, an evacuated tube comprising a photocathode, means to direct a plurality of laser beams onto said photocathode, the frequencies of said laser beams being separated in steps of the frequency of the energy to be generated, means to multiply the current of the bunched electron beam emitted by said photocathode, means to focus said electron beam, means to accelerate said electron beam to a velocity of more than 10% of the velocity of light in free space, means to extract the energy in the alternating current component of said electron beam, said last-named means comprising a solid dielectric surrounding said accelerated electron beam, the dielectric constant of said dielectric being at least one hundred, said dielectric being so shaped as to collimate the Cerenkov radiation emerging therefrom.

3. A generator of ultra-microwave coherent electromagnetic radiation comprising, means to heterodyne a plurality of coherent light beams at a photocathode thereby obtaining an electron beam which is bunched at the difference frequency of said light beams, and means to convert the energy of said electron beam at said difference frequency into coherent electromagnetic radiation, said last-named means comprising a Cerenkov coupler.

4. A generator of ultra-microwave coherent electromagnetic radiation comprising, means for generating a tightly bunched electron beam by illuminating a photocathode simultaneously with a plurality of coherent light beams of different frequency, and means including a Cerenkov radiator for converting the fundamental alternating component of energy in said electron beam to coherent electromagnetic radiation.

5. A generator of coherent electromagnetic waves intermediate the microwave and infra-red regions of the spectrum comprising, means for producing a tightly bunched electron beam by illuminating a photocathode simultaneously with a plurality of laser beams of different frequency, means to multiply the current of said electron beam by means of secondary emission and means to pass said electron beam through a Cerenkov output coupler.

6. A generator of coherent electromagnetic radiation of wavelength of the order of one millimeter comprising, means to heterodyne a plurality of monochromatic coherent light beams at a photocathode to produce an electron beam bunched at the difference frequency of said light beams, means to increase the current of said electron beam by means of secondary emission, and means including a Cerenkov radiator for converting the difference frequency energy of said electron beam to coherent radiation.

7. A generator of ultra-microwave electromagnetic radiation comprising, an evacuated electron discharge tube, said tube including a photoemissive cathode, means to illuminate said cathode simultaneously with a pair of monochromatic laser beams with a difference frequency equal the desired ultra-microwave output frequency, thereby producing an electron beam bunched at said difference frequency, means to increase the current of said electron beam by means of a plurality of dynodes, means to focus said electron beam, means to accelerate said electron beam to a velocity of more than 10% of that of light in free space, means to pass said accelerated beam through a solid dielectric with a dielectric constant of approximately one hundred, said dielectric being shaped to project the radiation emerging therefrom in a single direction.

8. A generator of ultra-microwave electromagnetic radiation comprising, an evacuated electron discharge tube including a photoemissive cathode, means to illuminate said cathode simultaneously with a pair of monochromatic laser beams with a difference frequency equal to the desired output frequency thereby producing an electron beam bunched at said difference frequency, means to increase the current of said electron beam by means of a plurality of dynodes, means to focus said electron beam, means to accelerate said electron beam, means to pass said accelerated electron beam through a central bore in a Cerenkov radiator, said Cerenkov radiator comprising a dielectric in which the phase velocity of light is less than the velocity of said accelerated electron beam, said Cerenkov radiator being in the general shape of a cone with said central bore passing through the axis of symmetry thereof and further including a conical cutaway section at the base of said cone whereby the radiation emerging therefrom is collimated parallel to said axis of symmetry.

9. A generator of ultra-microwave electromagnetic radiation comprising, an evacuated electron discharge device including a photocathode, means to illuminate said photocathode simultaneously by means of three monochromatic laser beams which are separated in frequency in steps of the desired output ultra-microwave frequency, means to increase the current of the bunched electron beam emitted by said photocathode, means to focus and accelerate said electron beam, and means to extract the energy in said electron beam at said ultra-microwave frequency by means of a Cerenkov radiator.

10. A generator of ultra-microwave electromagnetic radiation comprising, an evacuated electron discharge device including a photocathode, means to illuminate said photocathode simultaneously by means of four monochromatic laser beams which are separated in frequency in steps of the desired output ultra-microwave frequency, means to increase the current of the bunched electron beam emitted by said photocathode, means to focus and accelerate said electron beam, means to pass said accelerated electron beam through an axial bore in a Cerenkov output coupler having the general shape of a cylinder, the end of said cylinder remote from said photocathode being conically tapered to collimate the ultra-microwave radiation emerging therefrom, said Cerenkov output coupler comprising a dielectric in which the phase velocity of light is less than the velocity of said accelerated electron beam.

11. A generator of ultra-microwave electromagnetic energy comprising, an evacuated electron discharge tube, said tube including a photocathode, means to illuminate said photocathode with the output of a single laser which operates simultaneously in two modes separated in frequency by the desired ultra-microwave output frequency, means to increase the current of the bunched electron beam emitted by said photocathode by means of secondary emission, means to focus and accelerate said electron beam, and means to extract the energy in said electron beam at said ultra-microwave frequency by means of a Cerenkov radiator.

12. A generator of ultra-microwave electromagnetic energy comprising, an evacuated electron discharge tube, said tube including a photocathode, means to illuminate said photocathode with the output of a single laser which operates simultaneously in two modes separated in frequency by the desired ultra-microwave output frequency, means to increase the current of the bunched electron beam emitted by said photocathode by means of secondary emission, means to focus and accelerate said electron beam, means to pass said accelerated electron beam through a ceneral bore in a Cerenkov radiator, said Cerenkov radiator comprising a dielectric in which the phase velocity of light is less than the velocity of said accelerated electron beam, said Cerenkov radiator being in the general shape of a cone with said central bore passing through the axis of symmetry thereof and further including a conical cutaway section at the base of said cone whereby the ultra-microwave radiation emerging therefrom is collimated parallel to said axis of symmetry.

References Cited by the Examiner

Cerenkov Radiation Approach to the Submillimeter Wave Problem, by P. D. Coleman, from Advances in Quantum Electronics, pp. 581 to 593, 1961.

Photodetection and Photomixing of Laser Outputs, by A. T. Forrester, from Advances in Quantum Electronics, edited by J. R. Singer, pp. 233 to 237, copyright 1961, Columbia University Press, New York and London.

RALPH G. NILSON, *Primary Examiner.*

ARCHIE R. BORCHELT, *Examiner.*